US008514202B2

United States Patent
Chou et al.

(10) Patent No.: US 8,514,202 B2
(45) Date of Patent: Aug. 20, 2013

(54) OPTICAL TOUCH APPARATUS AND OPERATING METHOD THEREOF

(75) Inventors: Chung-Cheng Chou, Lujhu Township, Taoyuan County (TW); William Wang, Taoyuan (TW); Meng-Shin Yen, Taipei (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 424 days.

(21) Appl. No.: 12/813,585

(22) Filed: Jun. 11, 2010

(65) Prior Publication Data

US 2010/0321343 A1 Dec. 23, 2010

(30) Foreign Application Priority Data

Jun. 23, 2009 (TW) ................................ 98121041 A

(51) Int. Cl.
*G06F 3/042* (2006.01)
(52) U.S. Cl.
USPC .......................................... 345/175; 345/173
(58) Field of Classification Search
None
See application file for complete search history.

(56) References Cited

U.S. PATENT DOCUMENTS

| | | | | | |
|---|---|---|---|---|---|
| 4,107,522 | A | * | 8/1978 | Walter | 250/221 |
| 4,986,662 | A | * | 1/1991 | Bures | 356/621 |
| 5,196,835 | A | * | 3/1993 | Blue et al. | 345/175 |
| 5,707,160 | A | * | 1/1998 | Bowen | 400/472 |
| 7,274,356 | B2 | * | 9/2007 | Ung et al. | 345/158 |

* cited by examiner

*Primary Examiner* — Sumati Lefkowitz
*Assistant Examiner* — Joseph Fox

(57) ABSTRACT

An optical touch apparatus is disclosed. The optical touch apparatus comprises a light source emitting module, an optical module, a light sensing module, and a processing module. The optical module and the light sensing module are set around a surface of the optical touch apparatus. The light source emitting module sequentially emits scanning lights uniformly distributed above a direct scanned region of the surface according to a time sequence. When an object forms a touch point on the surface, the object will block the scanning lights and reflected lights reflected by the optical module. The light sensing module generates a sensing result according to the condition the light sensing module receives the scanning lights and the reflected lights. The processing module determines the position of the touch point according to the time sequence and the sensing result.

10 Claims, 6 Drawing Sheets

Figure 3A:
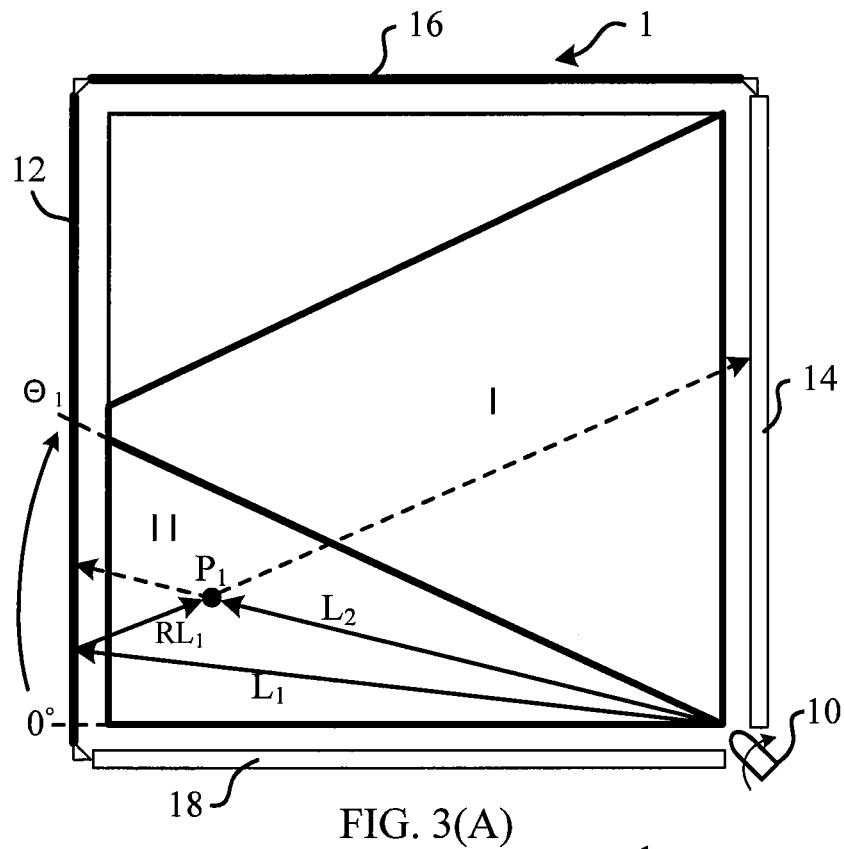

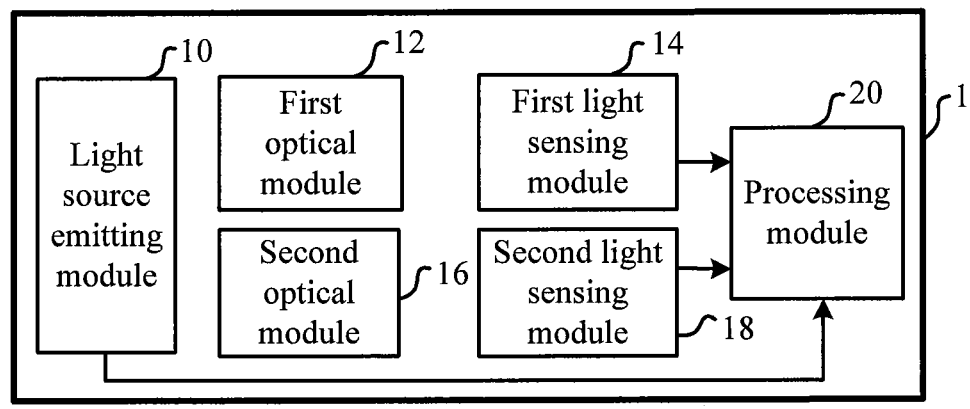
FIG. 1
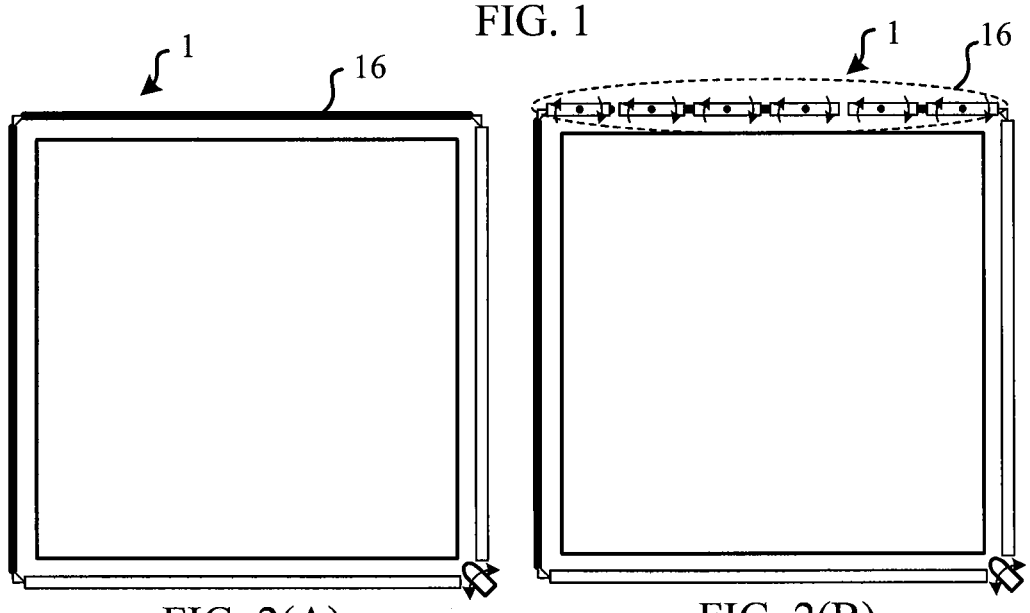
FIG. 2(A)          FIG. 2(B)
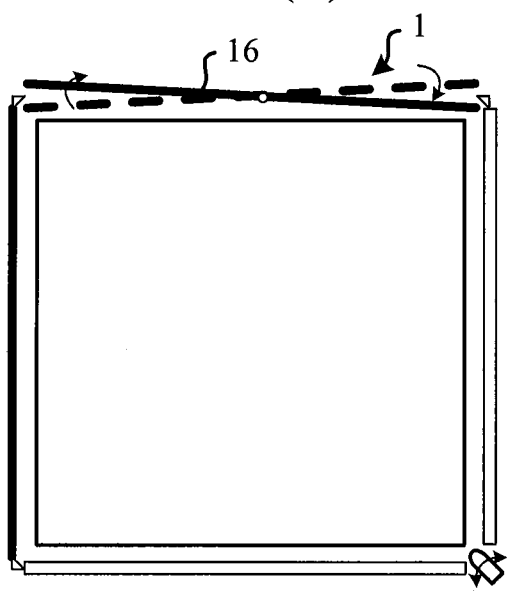     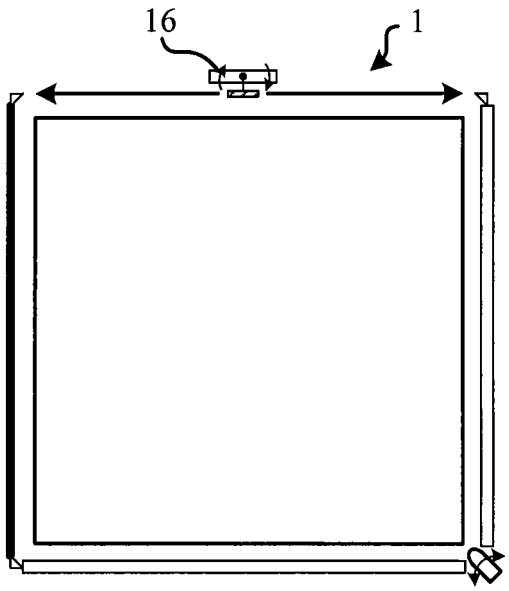
FIG. 2(C)          FIG. 2(D)

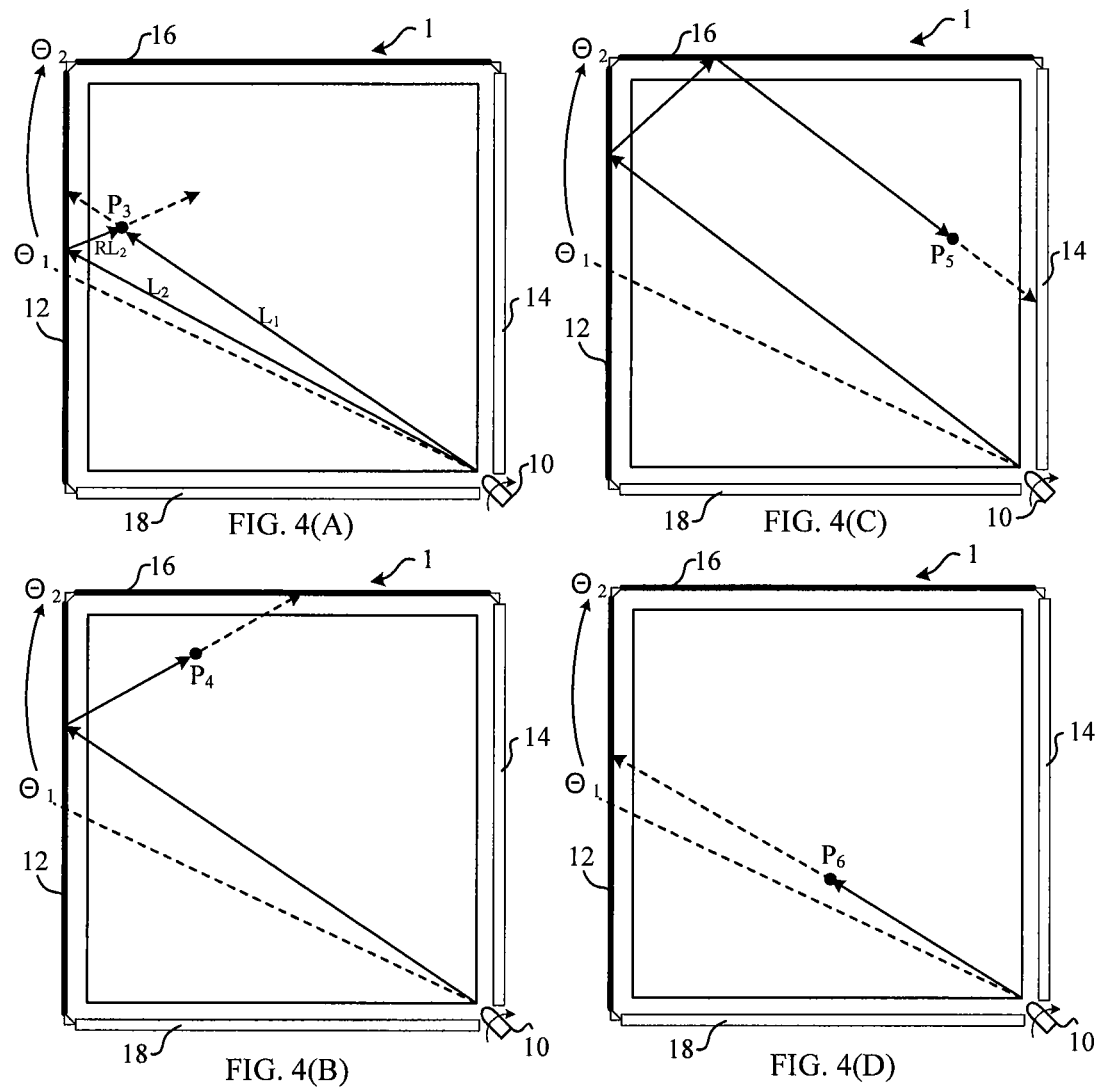

OPTICAL TOUCH APPARATUS AND OPERATING METHOD THEREOF

BACKGROUND OF THE INVENTION

1. Field of the Invention

The present invention relates to a touch apparatus, and more particularly, to an optical touch apparatus capable of effectively covering the entire possible touch point location region under the condition that the light source emitter can only rotate limited rotation angle and operating method thereof.

2. Description of the Prior Art

In general, the current touch apparatus, such as a resistance touch apparatus, a capacitance touch apparatus, and an optical touch apparatus, can detect one touch point or more touch points through different detection theorems or ways. In the various types of touch apparatus mentioned above, because the optical touch apparatus has a characteristic of good transmittance; it has become another well-used technology different from the resistance touch apparatus and the capacitance touch apparatus.

However, the conventional optical touch apparatus must comprise many light source emitters and light receivers set around the panel to detect touch points, therefore, additional space requirement of the entire panel apparatus is caused, so that the volume of the conventional optical touch apparatus can not be reduced, the manufacturing cost will be also huge, and the conventional optical touch apparatus also fails to achieve touch point detection with high resolution. Recently, the triangulation measurement method is applied to the optical touch technology to detect the touch points. In this way, the touch inputting resolution can be enhanced and the amount of the light emitters and the light receivers can be reduced, however, not only the problem of additional space requirement can not be solved, but also some new problems such as complicated calculations and the reflector of the border should be positioned precisely are occurred.

Although the current optical touch apparatus can use the optical devices such as the rotational light source emitter, the light guider, and the photoelectric sensor to achieve the touch point detection with high resolution to effectively solve the above-mentioned problems. However, the optical touch apparatus not only needs to increase the cost of disposing the light guiders, but also its rotational light source emitter needs to rotate within a large angle range, so that the scanning lights can fully cover the entire area of the possible touch point location region on the panel, accordingly, the optical touch apparatus will have non-ideal operating frequency when the optical touch apparatus practically senses the touch points, and this problem should be solved.

Therefore, the invention provides an optical touch apparatus and operating method thereof to solve the aforementioned problems.

SUMMARY OF THE INVENTION

The invention provides an optical touch apparatus and operating method thereof. A first embodiment of the invention is an optical touch apparatus. In this embodiment, the optical touch apparatus includes a light source emitting module, an optical module, a light sensing module, and a processing module. The optical module and the light sensing module are set around a surface of the optical touch apparatus respectively. The light source emitting module sequentially emits a plurality of scanning lights according to a time sequence to make the plurality of scanning lights uniformly to be distributed above at least one direct scanned region of a surface of the optical touch apparatus. When an object forms a touch point on the surface, the object blocks at least one scanning light of the plurality of scanning lights and at least one first reflected light of the plurality of first reflected lights. The first light sensing module generates a sensing result according to the condition of receiving the plurality of scanning lights and the plurality of first reflected lights. The processing module determines a position of the touch point on the surface according to the time sequence and the sensing result.

The second embodiment of the invention is an optical touch apparatus operating method. In this embodiment, the optical touch apparatus includes a light source emitting module, an optical module, a light sensing module, and a processing module. The optical module and the light sensing module are set around a surface of the optical touch apparatus respectively. In this embodiment, at first, the light source emitting module sequentially emits a plurality of scanning lights according to a time sequence to make the plurality of scanning lights uniformly to be distributed above at least one direct scanned region of a surface of the optical touch apparatus. When an object forms a touch point on the surface, the object blocks at least one scanning light of the plurality of scanning lights and at least one first reflected light of the plurality of first reflected lights. Then, the light sensing module generates a sensing result according to the condition of receiving the plurality of scanning lights and the plurality of first reflected lights. At last, the processing module determines a position of the touch point on the surface according to the time sequence and the sensing result.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

FIG. 1 illustrates a functional block diagram of the optical touch apparatus of the first embodiment in the invention.

FIG. 2(A)~(D) illustrate scheme diagrams of different types of second optical modules.

Figure 3B:
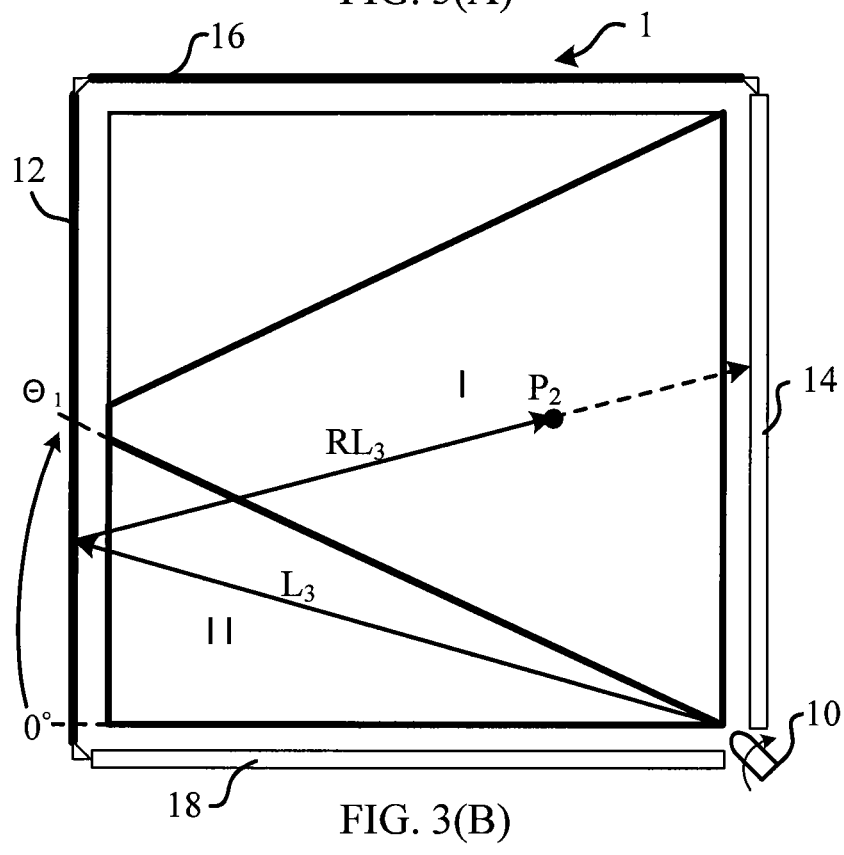

FIG. 3(A) illustrates a scheme diagram of the touch point $P_1$ formed by the object in the scanning region II, when the light source emitting module rotates from 0° to $\theta_1$ and emits the scanning lights in order; FIG. 3(B) illustrates a scheme diagram of the touch point $P_2$ formed by the object in the scanning region I, when the light source emitting module rotates from 0° to $\theta_1$ and emits the scanning lights in order.

FIG. 4(A)~(D) illustrate scheme diagrams of the different touch points $P_3$, $P_4$, $P_5$, and $P_6$ formed by the object when the light source emitting module scans from $\theta_1$ to $\theta_2$.

Figure 5:
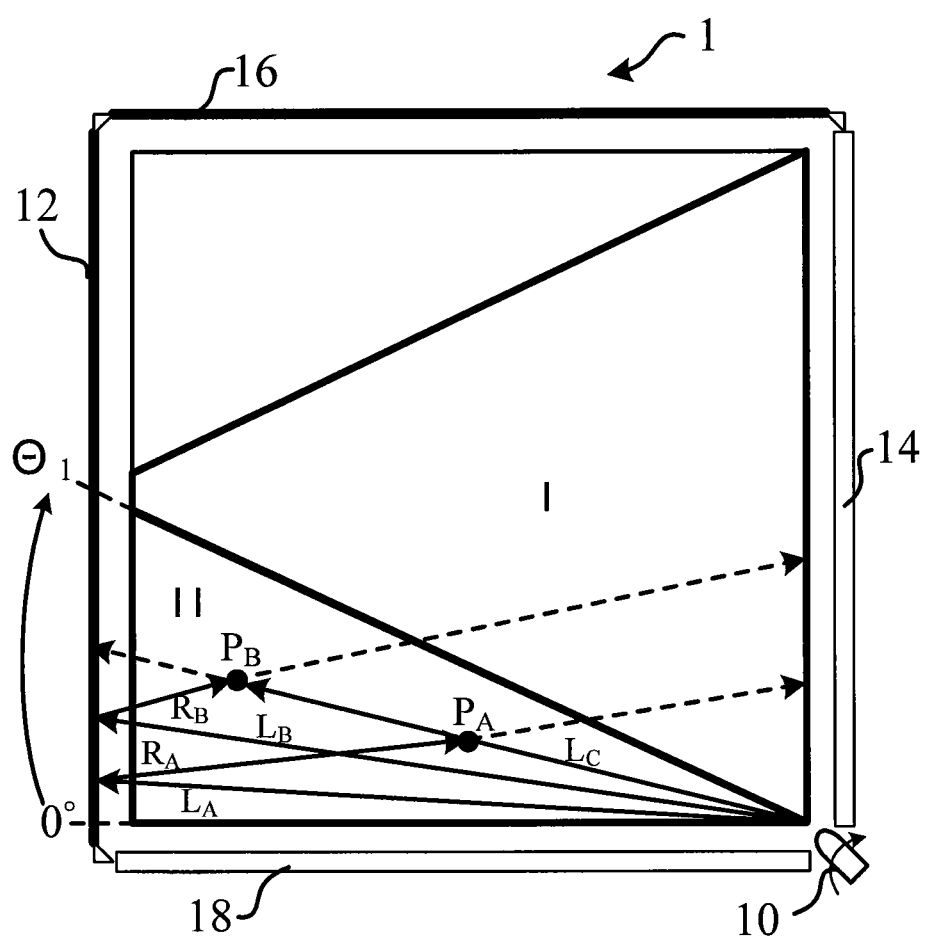

FIG. 5 illustrates a scheme diagram of different touch points $P_A$ and $P_B$ in the scanning region II when the light source emitting module rotates from 0° to $\theta_1$.

Figure 6A:
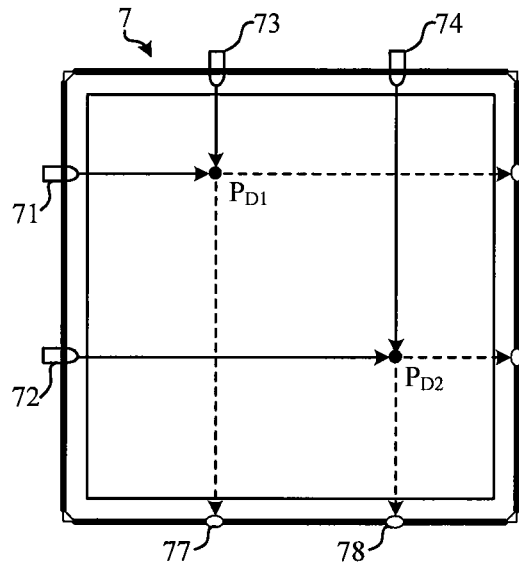
Figure 6B:
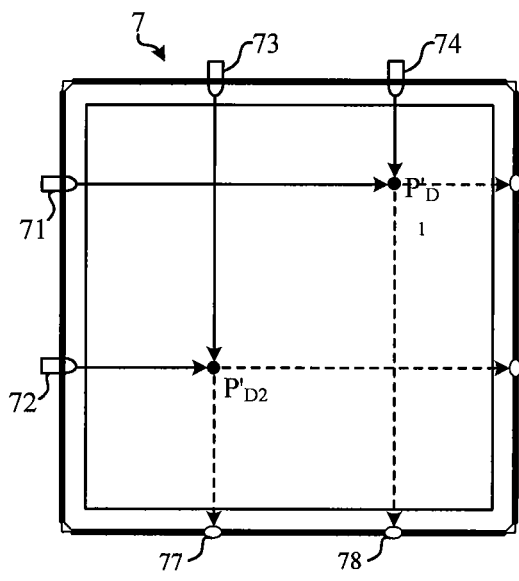

FIG. 6(A)~(B) illustrate the conditions the optical touch apparatus fails to determine two touch points in the prior art.

Figure 7A:
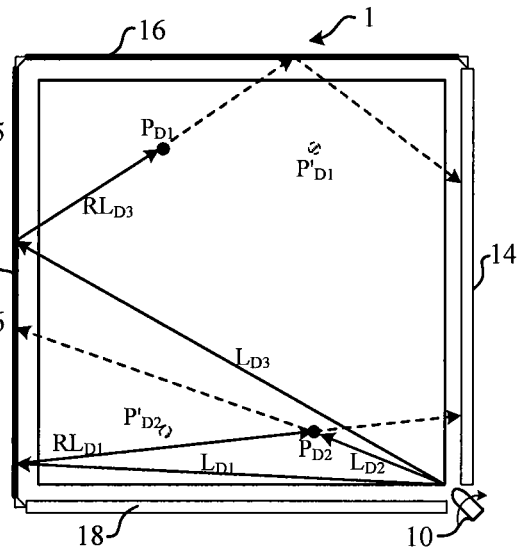
Figure 7B:
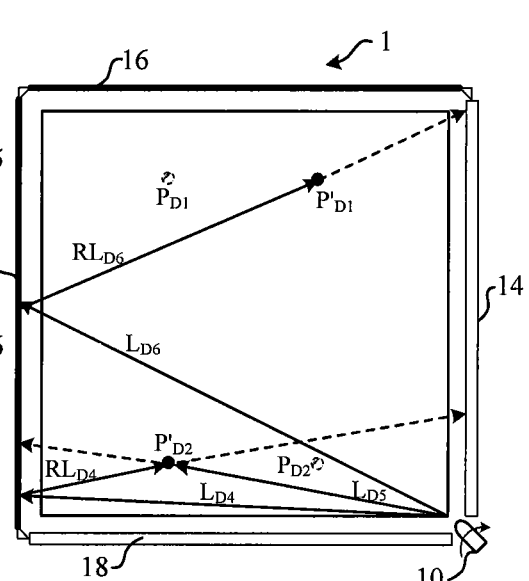

FIG. 7(A)~FIG. 7(B) illustrate that the optical touch apparatus of the invention can effectively solve the problem of failing to determine two touch points in FIG. 6(A) and FIG. 6(B).

Figure 8:
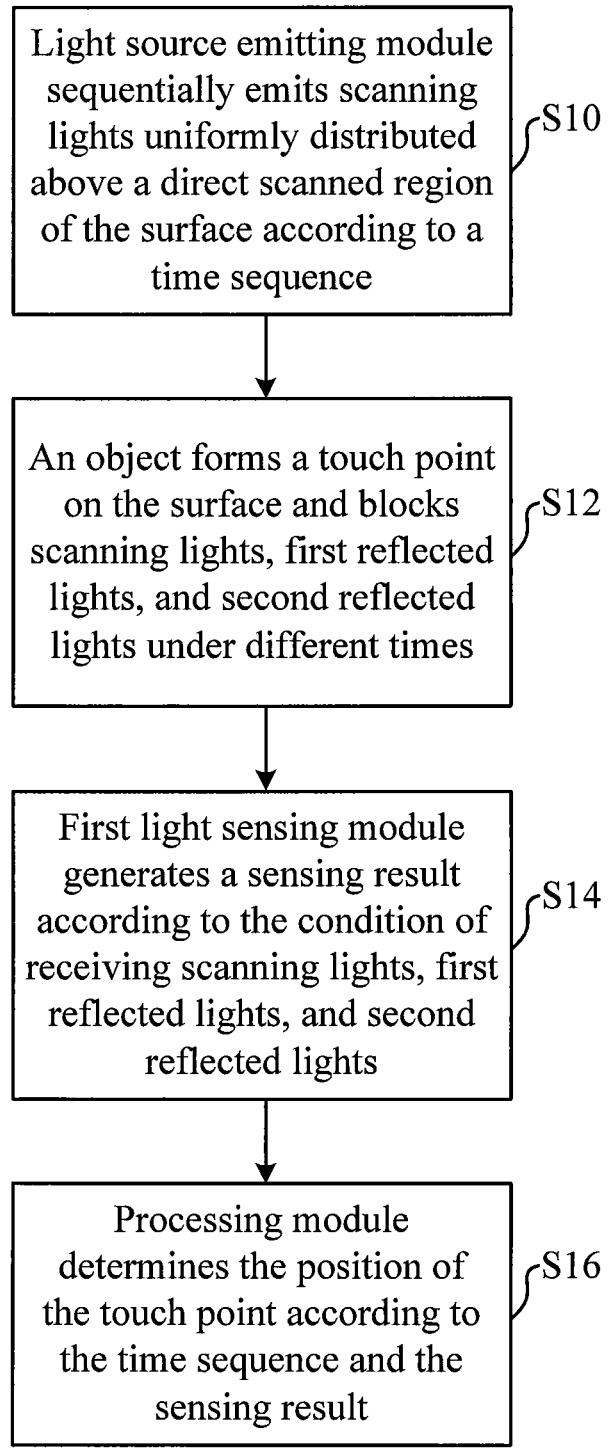

FIG. 8 illustrates a flowchart of the optical touch apparatus operating method in the second embodiment of the invention.

DETAILED DESCRIPTION OF THE INVENTION

The optical touch apparatus and operating method of the invention can effectively cover the entire possible touch point location region under the condition that the light source emitter has only limited rotation angle, so that the operation frequency of the optical touch apparatus can be increased and the accuracy degree of determining the position of the touch point can be also enhanced.

A first embodiment of the invention is an optical touch apparatus. In this embodiment, the optical touch apparatus is used for sensing and determining the position of the touch point in an optical way. Please refer to FIG. 1. FIG. 1 shows the functional block diagram of the optical touch apparatus.

As shown in FIG. 1, the optical touch apparatus 1 includes a light source emitting module 10, a first optical module 12, a first light sensing module 14, a second optical module 16, a second light sensing module 18, and a processing module 20. Wherein, the first optical module 12, the first light sensing module 14, the second optical module 16, and the second light sensing module 18 are set at a first side, a second side, a third side, and a fourth side around a surface of the optical touch apparatus 1, but not limited to this case; the processing module 20 is coupled to the light source emitting module 10, the first light sensing module 14, and the second sensing module 18.

In practical applications, the first optical module 12 and the second optical module 16 are apparatuses capable of reflecting lights instead of the light guiders used in the prior art. For example, as shown in FIG. 2(A)~(D), the second optical module 16 can be a single light reflector, a single rotational light reflector, a plurality of mini-rotational light reflectors, and a single movable rotational light reflector, or a light reflector/sensor having the functions of reflection and sensing at the same time, and the second optical module 16 has no limitations. The first optical module 12 has similar condition, so it is not mentioned again here.

In this embodiment, the light source emitting module 10 is a rotational light source emitter used for sequentially emitting a plurality of scanning lights according to a time sequence in a rotational way. In fact, the time sequence relates to the sequence of the light source emitting module 10 emitting the plurality of scanning lights. For example, in the time sequence, it is assumed that the light source emitting module 10 emits a first scanning light, a second scanning light, and a third scanning light at a first time T1, a second time T2, and a third time T3 respectively, wherein the first time T1 is earlier than the second time T2 and the second time T2 is earlier than the third time T3. There is an equal time interval between the first time T1 and the second time T2 and between the second time T2 and the third time T3, and the time interval $\Box$t can be a default value or set by the user. That is to say, the light source emitting module 10 emits the first scanning light, the second scanning light, and the third scanning light in order every time interval $\Box$t from the first time T1 according to the time sequence. Therefore, in this embodiment, the scanning light emitting sequence included in the time sequence is indeed an important basis for the optical touch apparatus 1 to determine the position of the touch point.

Next, the condition of the optical touch apparatus 1 determining a single touch point will be described. Please refer to FIG. 3(A). FIG. 3(A) illustrates a scheme diagram of the touch point $P_1$ formed by the object in the scanning region II, when the light source emitting module 10 rotates from 0° to $\theta_1$ and emits the scanning lights in order. In this embodiment, since the light source emitting module 10 rotates from 0° to $\theta_1$, therefore, the plurality of scanning lights emitted by the light source emitting module 10 in order will be uniformly distributed above the scanning region II. As shown in FIG. 3(A), when the light source emitting module 10 emits the scanning light $L_1$, the scanning light $L_1$ will not be directly blocked by the object disposed at the touch point $P_1$, but the first reflected light $RL_1$ reflected by the first optical module 12 will be blocked by the object and the first reflected light $RL_1$ can not be received by the first light sensing module 14.

Afterward, when the light source emitting module 10 emits the scanning light $L_2$, the scanning light $L_2$ will be directly blocked by the object, therefore, the scanning light $L_2$ can not be emitted to the first optical module 12, and of course the scanning light $L_2$ can not be reflected to the first light sensing module 14. As to the other scanning lights emitted by the light source emitting module 10 within the an angle range of 0° to $\theta_1$, since these scanning lights will not be blocked by the object, therefore, these scanning lights will be reflected by the first optical module 12 and received by the first light sensing module 14.

In this embodiment, within the scanning lights emitted by the light source emitting module 10 in order within the angle range of 0° to $\theta_1$ according to the time sequence, only the reflected lights of the scanning lights $L_1$ and $L_2$ can not be received by the first light sensing module 14, then the first light sensing module 14 will generate a sensing result according to this receiving condition and transmit the sensing result to the processing module 20. Since the light source emitting module 10 scans from 0° to $\theta_1$ and the first light sensing module 14 can not receive two reflected lights corresponding to the scanning lights $L_1$ and $L_2$, therefore, the processing module 20 can accordingly determine that the touch point P should be in the scanning region II, and its exact position is at $P_1$ in FIG. 3(A). In fact, the processing module 20 can get the corresponding relationships between the scanning light emitting time sequence and the touch point position by searching the default look-up table, but not limited to this case.

Then, please refer to FIG. 3(B). FIG. 3(B) illustrates a scheme diagram of the touch point $P_2$ formed by the object in the scanning region I, when the light source emitting module 10 rotates from 0° to $\theta_1$ and emits the scanning lights in order. As shown in FIG. 3(B), since the light source emitting module 10 only rotates from 0° to $\theta_1$, therefore, the object forming the touch point $P_2$ can not directly block any one scanning light emitted from the light source emitting module 10, the object can only block the first reflected light $RL_3$ formed by the first optical module 12 reflecting the scanning light $L_3$.

That is to say, within the scanning lights emitted by the light source emitting module 10 in order within the angle range of 0° to $\theta_1$ according to the time sequence, only the reflected light $RL_3$ of the scanning light $L_3$ can not be received by the first light sensing module 14, then the first light sensing module 14 will generate a sensing result according to this receiving condition and transmit the sensing result to the processing module 20. Since the light source emitting module 10 scans from 0° to $\theta_1$ and the first light sensing module 14 can not receive a reflected light corresponding to the scanning light $L_3$, therefore, the processing module 20 can accordingly determine that the touch point P should be in the scanning region I, and its exact position is at $P_2$ in FIG. 3(B).

Similarly, FIG. 4(A)~(D) illustrate scheme diagrams of the different touch points $P_3$, $P_4$, $P_5$, and $P_6$ formed by the object when the light source emitting module 10 scans from $\theta_1$ to $\theta_2$. Wherein, the object forming the touch point $P_3$ not only directly blocks the scanning light $L_1$ emitted from the light source emitting module 10, but also blocks the reflected light $RL_2$ formed by the first optical module 12 reflecting the scanning light $L_2$. As to the objects forming the touch points $P_4$ and $P_5$, since the objects are not in the scanning range of the light source emitting module 10, therefore, the objects fail to directly block any scanning lights emitted from the light source emitting module 10, and the objects can only block the reflected light reflected by the first optical module 12 or the second optical module 16. In addition, the object forming the touch point $P_6$ can only directly block one scanning light emitted from the light source emitting module 10, and the object fails to block the reflected light reflected by the first optical module 12 or the second optical module 16. Since its touch point determining theorem is similar to the above-mentioned content, so that it is not described again here. It should be noticed that when the light source emitting module 10 rotates from 0° to $\theta_2$, all possible touch point location regions can be fully covered, but the scanning angle of the light source emitting module 10 is even smaller than the scanning angle in the prior art. That is to say, the time needed for the light source emitting module 10 of the invention to perform a scanning process is less than the time needed in the prior art under the same scanning rate, therefore, the scanning times in an unit time (i.e., the scanning frequency) can be largely increased.

Please refer to FIG. 5. FIG. 5 illustrates a scheme diagram of determining different touch points $P_A$ and $P_B$ in the scanning region II when the light source emitting module 10 rotates from 0° to $\theta_1$. As shown in FIG. 5, when the light source emitting module 10 rotates from 0° to $\theta_1$, if the different touch points $P_A$ and $P_B$ are formed by an object A and an object B under different times respectively, although the scanning light $L_C$ is directly blocked by the object A and the object B respectively, the reflected light $R_A$ blocked by the object A is different from the reflected light $R_B$ blocked by the object B. Wherein, the reflected light $R_A$ is formed by the first optical module 12 reflecting the scanning light $L_A$; the reflected light $R_B$ is formed by the first optical module 12 reflecting the scanning light $L_B$. In the time sequence of the light source emitting module 10 emitting the scanning lights, the emitting sequence of the scanning light $L_A$ is earlier than that of the scanning light $L_B$. Therefore, the processing module 20 can determine the exact positions of different touch points $P_A$ and $P_B$ in the scanning region II according to this time sequence respectively. The above-mentioned condition is the condition that different touch points are collinear to the same scanning light. As to the condition that different touch points are collinear to the same reflected light, since the scanning lights respectively directly blocked by the objects forming these touch points are different, the processing module 20 can distinguish the position differences between these touch points according to the emitting sequence of these scanning lights in the scanning light emitting time sequence of the light source emitting module 10.

After the condition of determining single touch point is introduced, then, the condition of determining multiple touch points will be discussed. As shown in FIG. 5, even the touch points $P_A$ and $P_B$ are formed by the object A and the object B under different times respectively, although the object A and the object B are both disposed on the path of the scanning light $L_C$ emitted to the first optical module 12, since the object A and the object B blocks different reflected lights $R_A$ and $R_B$, therefore, the processing module 20 can accordingly distinguish the position difference between the touch points $P_A$ and $P_B$ without the condition of touch point error determination.

Please refer to FIG. 6(A) and FIG. 6(B). FIG. 6(A) and FIG. 6(B) illustrate the conditions the optical touch apparatus fails to determine two touch points in the prior art. For the optical touch apparatus 7, the touch points $P_{D1}$ and $P_{D2}$ shown in FIG. 6(A) and the touch points $P'_{D1}$ and $P'_{D2}$ shown in FIG. 6(B) will both cause the condition that the light receivers 75~78 fail to receive the lights emitted from the light emitters 71~74 respectively, therefore, since the same sensing result will be generated, the conventional optical touch apparatus 7 will fail to distinguish the practical touch point locations are the touch points $P_{D1}$ and $P_{D2}$ or the touch points $P'_{D1}$ and $P'_{D2}$.

The above-mentioned problem in the prior art can be effectively solved by the optical touch apparatus 1 provided in the invention. As shown in FIG. 7(A), if the two touch points $P_{D1}$ and $P_{D2}$ are formed by different objects, the object forming the touch point $P_{D2}$ will block the first reflected light $RL_{D1}$ formed by the first optical module 12 reflecting the scanning light $L_{D1}$ and directly block the scanning light $L_{D1}$ emitted from the light source emitting module 10. And, the object forming the touch point $P_{D1}$ will only block the first reflected light $RL_{D3}$ formed by the first optical module 12 reflecting the scanning light $L_{D3}$.

On the other hand, as shown in FIG. 7(B), if the two touch points $P'_{D1}$ and $P'_{D2}$ are formed by different objects, the object forming the touch point $P'_{D2}$ will block the first reflected light $RL_{D4}$ formed by the first optical module 12 reflecting the scanning light $L_{D4}$ and directly block the scanning light $L_{D5}$ emitted from the light source emitting module 10. And, the object forming the touch point $P'_{D1}$ will only block the first reflected light $RL_{D6}$ formed by the first optical module 12 reflecting the scanning light $L_{D6}$.

It can be found by comparing FIG. 7(A) and FIG. 7(B), obviously, since the scanning light $L_{D1}$ does not equal to the scanning light $L_{D4}$, namely the first reflected light $RL_{D1}$ does not equal to the first reflected light $RL_{D4}$, and the scanning light $L_{D2}$ does not equal to the scanning light $L_{D5}$, therefore, the optical touch apparatus 1 can effectively distinguish the touch points $P_{D2}$ and $P'_{D2}$ according to the time sequence of the light source emitting module 10 emitting these scanning lights. In the same way, since the scanning light $L_{D3}$ does not equal to the scanning light $L_{D6}$, namely the first reflected light $RL_{D3}$ does not equal to the first reflected light $RL_{D6}$, therefore, the optical touch apparatus 1 can effectively distinguish the touch points $P_{D1}$ and $P'_{D1}$ according to the time sequence of the light source emitting module 10 emitting these scanning lights. Therefore, the optical touch apparatus 1 of the invention can effectively improve the condition that the conventional optical touch apparatus 7 fails to determine the practical touch point locations.

The second embodiment of the invention is an optical touch apparatus operating method. In this embodiment, the optical touch apparatus includes a light source emitting module, a first optical module, a first light sensing module, a second optical module, a second light sensing module, and a processing module. Wherein, the first optical module, the first light sensing module, the second optical module, and the second light sensing module are disposed at a first side, a second side, a third side, and a fourth side of the surface respectively, but not limited to this case. Please refer to FIG. 8. FIG. 8 illustrates a flowchart of the optical touch apparatus operating method.

As shown in FIG. 8, in step S10, the light source emitting module sequentially emits a plurality of scanning lights according to a time sequence to make the plurality of scanning lights uniformly to be distributed above at least one direct scanned region of a surface of the optical touch apparatus. In practical applications, the light source emitting module is a rotational light source emitter, the surface is divided into the at least one direct scanned region and at least one indirect scanned region according to the rotation angle covering range of the light source emitting module emitting the plurality of scanning lights (e.g., the first reflection scanning region or the second reflection scanning region). In addition, the time sequence relates to the sequence of light source emitting module emitting the plurality of scanning lights.

Next, in step S12, when an object forms a touch point on the surface, the object blocks at least one scanning light of the plurality of scanning lights, at least one first reflected light of the plurality of first reflected lights, and at least one second reflected light of the plurality of second reflected lights respectively under different times, wherein the plurality of first reflected lights and second reflected lights are formed by being reflected by the first optical module and the second optical module respectively. Then, in step S14, the first light sensing module generates a sensing result according to the condition of receiving the plurality of scanning lights, the plurality of first reflected lights, and the plurality of second reflected lights. At last, in the step S16, the processing module determines a position of the touch point on the surface according to the time sequence and the sensing result.

Compared to prior arts, since the optical touch apparatus disclosed by the invention has the reflective optical units disposed around the panel, its rotational light source module can only rotate the angle range smaller than that in prior arts to fully cover the entire area of the possible touch point location regions on the panel. Therefore, the optical touch apparatus can provide more times of scanning to and fro in a unit time to increase its operating frequency and enhance the accuracy of determining the positions of the touch points.

Although the present invention has been illustrated and described with reference to the preferred embodiment thereof, it should be understood that it is in no way limited to the details of such embodiment but is capable of numerous modifications within the scope of the appended claims.

What is claimed is:

1. An optical touch apparatus, comprising:
a light source emitting module, for sequentially emitting a plurality of scanning lights according to a time sequence to make the plurality of scanning lights uniformly to be distributed above at least one direct scanned region of a surface of the optical touch apparatus;
a first optical module, set around the surface, for reflecting the plurality of scanning lights to form a plurality of first reflected lights, wherein the first optical module has a flat reflecting surface and the plurality of first reflected lights is not parallel to each other;
a first light sensing module, set around the surface, when an object forms a touch point on the surface, the object blocking at least one scanning light of the plurality of scanning lights and at least one first reflected light of the plurality of first reflected lights, the first light sensing module generating a sensing result according to the condition of receiving the plurality of scanning lights and the plurality of first reflected lights; and
a processing module, coupled to the light source emitting module and the first light sensing module, for determining a position of the touch point on the surface according to the time sequence and the sensing result;
wherein the first optical module and the first light sensing module are set at a first side and at a second side of the surface respectively, the first side and the second side are opposite and the second side is closer to the light source emitting module than the first side;
a second optical module, set at a third side different from the first side and the second side on the surface, for reflecting the plurality of first reflected lights to form a plurality of second reflected lights; and
a second light sensing module, set at a fourth side different from the first side, the second side, and the third side on the surface, when the object forms the touch point on the surface, the object blocking the at least one scanning light, the at least one first reflected light, and at least one second reflected light of the plurality of second reflected lights under different times, the first light sensing module and the second light sensing module generating the sensing result according to the conditions of receiving the plurality of scanning lights, the plurality of first reflected lights, and the plurality of second reflected lights.

2. The optical touch apparatus of claim 1, wherein the light source emitting module is a rotational light source emitter, the surface is divided into the at least one direct scanned region and at least one indirect scanned region according to the rotation angle covering range of the light source emitting module emitting the plurality of scanning lights.

3. The optical touch apparatus of claim 1, wherein the time sequence relates to the sequence of the light source emitting module emitting the plurality of scanning lights.

4. The optical touch apparatus of claim 1, wherein in the time sequence, the light source emitting module emits a first scanning light, a second scanning light, and a third scanning light of the plurality of scanning lights at a first time, a second time, and a third time respectively, the first time is earlier than the second time and the second time is earlier than the third time.

5. The optical touch apparatus of claim 4, wherein there is a time interval of the same length between the first time and the second time and between the second time and the third time, the time interval is default value and set by the user.

6. The optical touch apparatus of claim 1, wherein the first optical module is selected from one of the group formed by a light reflector, a light reflector/sensor, a rotational light reflector, a plurality of mini-rotational light reflectors, and a movable rotational light reflector.

7. The optical touch apparatus of claim 1, wherein the second optical module is selected from one of the group formed by a light reflector, a light reflector/sensor, a rotational light reflector, a plurality of mini-rotational light reflectors, and a movable rotational light reflector.

8. A method of operating an optical touch apparatus, the optical touch apparatus comprising a light source emitting module, a first optical module, a first light sensing module, and a processing module, the first optical module and the first light sensing module being set around the surface respectively, the method comprising the steps of:
the light source emitting module sequentially emitting a plurality of scanning lights according to a time sequence to make the plurality of scanning lights uniformly to be distributed above at least one direct scanned region of a surface of the optical touch apparatus;
when an object forms a touch point on the surface, the object blocking at least one scanning light of the plurality of scanning lights and at least one first reflected light of a plurality of first reflected lights, wherein the first optical module has a flat reflecting surface to reflects the plurality of scanning lights to form the plurality of first reflected lights not parallel to each other;
the first light sensing module generating a sensing result according to the condition of receiving the plurality of scanning lights and the plurality of first reflected lights; and
the processing module determining a position of the touch point on the surface according to the time sequence and the sensing result;
wherein the optical touch apparatus further comprises a second optical module and a second light sensing module, the first optical module, the first light sensing module, the second optical module, and a second light sensing module are set at a first side, a second side, a third side, and a fourth side on the surface respectively;

the second optical module reflecting the plurality of first reflected lights to form a plurality of second reflected lights;

when the object forms the touch point on the surface, the object blocking the at least one scanning light, the at least one first reflected light, and at least one second reflected light of the plurality of second reflected lights under different times respectively; and the first light sensing module and the second light sensing module generating the sensing result according to the conditions of receiving the plurality of scanning lights, the plurality of first reflected lights, and the plurality of second reflected lights.

9. The method of claim 8, wherein the light source emitting module is a rotational light source emitter, the surface is divided into the at least one direct scanned region and at least one indirect scanned region according to the rotation angle covering range of the light source emitting module emitting the plurality of scanning lights.

10. The method of claim 8, wherein the time sequence relates to the sequence of the light source emitting module emitting the plurality of scanning lights.

* * * * *